(12) United States Patent
D'Andrea et al.

(10) Patent No.: US 8,484,060 B2
(45) Date of Patent: Jul. 9, 2013

(54) PROJECT ESTIMATING SYSTEM AND METHOD

(75) Inventors: Anthony P. D'Andrea, Malvern, PA (US); Rolf J. Huelsebusch, Flemington, NJ (US); Robert D. Keith, Kirkwood, MO (US); Bruce Wallman, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 2625 days.

(21) Appl. No.: 10/447,245

(22) Filed: May 28, 2003

(65) Prior Publication Data

US 2004/0243457 A1    Dec. 2, 2004

(51) Int. Cl.
*G06Q 10/06*  (2012.01)

(52) U.S. Cl.
USPC .......................................................... 705/7.13

(58) Field of Classification Search
CPC .............................................. G06Q 10/06311
USPC ...................................................... 705/7.13
See application file for complete search history.

(56) References Cited

U.S. PATENT DOCUMENTS

| | | | |
|---|---|---|---|
| 4,744,028 A | 5/1988 | Karmarkar | |
| 4,852,001 A | 7/1989 | Tsushima et al. | |
| 5,325,525 A * | 6/1994 | Shan et al. | 718/104 |
| 5,343,388 A | 8/1994 | Wedelin | |
| 5,406,476 A * | 4/1995 | Deziel et al. | 705/8 |
| 5,408,663 A * | 4/1995 | Miller | 718/104 |
| 5,724,262 A | 3/1998 | Ghahramani | |
| 5,793,632 A | 8/1998 | Fad et al. | |
| 5,815,638 A | 9/1998 | Lenz et al. | |
| 5,826,236 A | 10/1998 | Narimatsu et al. | |
| 5,974,392 A | 10/1999 | Endo | |
| 6,047,260 A * | 4/2000 | Levinson | 705/9 |
| 6,049,776 A | 4/2000 | Donnelly et al. | |
| 6,088,678 A | 7/2000 | Shannon | |
| 6,351,734 B1 | 2/2002 | Lautzenheiser et al. | |
| 6,370,231 B1 | 4/2002 | Hice | |
| 6,445,968 B1 * | 9/2002 | Jalla | 700/101 |
| 6,578,005 B1 * | 6/2003 | Lesaint et al. | 705/8 |
| 7,062,449 B1 * | 6/2006 | Clark | 705/9 |
| 7,089,193 B2 * | 8/2006 | Newbold | 705/9 |
| 7,139,720 B1 * | 11/2006 | Foell et al. | 705/8 |
| 2003/0061266 A1 * | 3/2003 | Ouchi | 709/106 |

OTHER PUBLICATIONS

Rajkumar et al, "A Resource Allocation Model for QoS Management", 0-8186-8268-X/97, IEEE 1997.*

(Continued)

*Primary Examiner* — Thomas Mansfield
(74) *Attorney, Agent, or Firm* — Douglas A. Lashmit; Hoffman Warnick LLC

(57) ABSTRACT

A system and method for calculating task times for a project. A project estimating system is disclosed that allocates time to a list of tasks, comprising: a system for determining a total project time to complete a project; and a time allocation system that generates a task time for each task based on the total project time and an estimating factor associated with each task, wherein the time allocation system includes an iterative algorithm that iteratively calculates an adjustment factor to be applied to each task. Finally, the calculated adjustment factor can be compared against preset levels and provide an indication of project risk and the likelihood that the project will complete on time.

12 Claims, 5 Drawing Sheets

OTHER PUBLICATIONS

Foster et al, "A Distributed Resource Management Architecture that Supports Advance Reservations and Co-Allocation", 0-7803-5671-3/99, IEEE 1999.*

Maurer et al, "Merging Project Planning and Web-Enabled Dynamic Workflow Technologies", IEEE Internet Computing, May/Jun. 2000.*

Passing, U. and S. Strahringer, "Estimating Software Project Effort Based on the Development Process," European Business School, Department of Information Systems, date unknown, source unknown.

* cited by examiner

| APPORTIONMENT OF EFFORT FOR ALL ROUTES | | | ADDITIONAL CONTEXT HELP | |
|---|---|---|---|---|
| ROUTE | LC USED IN APPORTIONMENT ▽ | TOTAL APPORTIONMENT (*TO DELETE CURRENT PHASE PERCENTAGES) | 0 | |
| | ASSUMPTIONS | | | |
| SIZE | 500 FUNCTION POINTS | | | |
| TECHNICAL | 20% 3GL, 80% 5GL (INTEGRATED DEVELOPMENT TOOLSET) | | | |
| PRODUCTIVITY RATE | 7.2 FUNCTION POINTS/PERSON MONTH, 19.4 HRS/FP | | | |
| PHASE OR MODULE | % OF PROJECT | PHASE HOURS | % OF PHASE | MODULE HOURS |
| REQUIREMENTS ANALYSIS | 10 | 994 | 42 | |
| SRA | | | 75 | 0 |
| PER | | | 25 | 0 |
| SOLUTION DEFINITION | 20 | 0 | | |
| SDS | | | 85 | 0 |
| PAI | | | 15 | 0 |
| DESIGN | 10 | 0 | | |
| TSD | | | 100 | 0 |
| BUILD AND TEST | 55 | 0 | | |
| TPD | | | 50 | 0 |
| UPD | | | 15 | 0 |
| SAT | | | 35 | 0 |
| TRANSITION | 5 | 0 | | |
| TRA | | | 100 | 0 |

| APPORTIONMENT OF EFFORT FOR ALL ROUTES | | | ADDITIONAL CONTEXT HELP | |
|---|---|---|---|---|
| ROUTE | LC USED IN APPORTIONMENT ▽ | TOTAL APPORTIONMENT (*TO DELETE CURRENT PHASE PERCENTAGES) | 9940 ←18 | |
| | | ASSUMPTIONS | | |
| SIZE | 500 FUNCTION POINTS | | | |
| TECHNICAL | 20% 3GL, 80% 5GL (INTEGRATED DEVELOPMENT TOOLSET) | | | |
| PRODUCTIVITY RATE | 7.2 FUNCTION POINTS/PERSON MONTH, 19.4 HRS/FP | | | |
| PHASE OR MODULE | % OF PROJECT | PHASE HOURS | % OF PHASE | MODULE HOURS |
| REQUIREMENTS ANALYSIS | 10 | 994 | | |
| SRA | | | 75 | 746 |
| PER | | | 25 | 248 |
| SOLUTION DEFINITION | 20 | 1988 | | |
| SDS | | | 85 | 1690 |
| PAI | | | 15 | 298 |
| DESIGN | 10 | 994 | | |
| TSD | | | 100 | 994 |
| BUILD AND TEST | 55 | 5467 | | |
| TPD | | | 50 | 2734 |
| UPD | | | 15 | 820 |
| SAT | | | 35 | 1913 |
| TRANSITION | 5 | 497 | | |
| TRA | | | 100 | 497 |

| CHOOSE | 2 - TOP DOWN ALLOCATION ▽ | | | | | FOR TOP DOWN ALLOCATION USE | 9940 | HOURS | TOTAL INIT. EST. 10328.3 | |
|---|---|---|---|---|---|---|---|---|---|---|
| OPTION | 4 - COUNT*(HIGH+LOW)/2*MULT+ADJ - AVERAGE ▽ | | | | | USE MULTIPLIER | 1 | AND ADJUSTMENT | 0 | |
| ACTION | 1 - CHANGE ▽ | | | | | | | FILTER BY | 1 - SHOW ALL ▽ | |
| LINE | FROM | TO | LVL | SUM | KEY AND DESCRIPTION | QIF NAME AND EST RANGE | COUNT | CALCULATION FORMULA | OVERRIDE | INIT EST |
| 1 | ☐ | ☐ | 1 | YES | SRA - SYSTEM REQUIREMENTS ANALYSIS (M) | | | | | 994.0 |
| 2 | ☐ | ☐ | 2 | YES | PPM 1 - START-UP | | | | | 86.0 |
| 3 | ☐ | ○ | 3 | NO | PPM1.1 - ENGAGE STAKEHOLDERS | ESTIMATE AS UNIT (PPM) - 1 TO 2 HR | 1 | [2]1*2*1+4=6.0 | | 6.0 |
| 4 | ☐ | ○ | 3 | NO | PPM1.2 - ESTABLISH OR CONFIRM PROJECT MANAGEMENT PROCESSES | ESTIMATE AS UNIT (PPM) - 6 TO 8 HR | 1 | [2]1*8*1+4=12.0 | | 12.0 |
| 5 | ☐ | ○ | 3 | NO | PPM1.2A - ESTABLISH OR CONFIRM CONFIGURATION MANAGEMENT PROCESSES | ESTIMATE AS UNIT (PPM) - 2 TO 4 HR | 1 | [2]1*4*1+4=8.0 | | 8.0 |

*FIG. 4*

| CHOOSE | 1 - BOTTOM UP ESTIMATE ▽ | | | | FOR TOP DOWN ALLOCATION USE | 9940 | HOURS | | TOTAL INIT. EST. 9936.3 |
|---|---|---|---|---|---|---|---|---|---|
| OPTION | 1 - NO CALCULATION OPTION SELECTED ▽ | | | | USE MULTIPLIER | 1 | AND ADJUSTMENT | 0 | |
| ACTION | 1 - CHANGE ▽ | | | | | | FILTER BY | 1 - SHOW ALL ▽ | |
| LINE | FROM | TO | LVL | SUM | KEY AND DESCRIPTION | QIF NAME AND EST RANGE | COUNT | CALCULATION FORMULA | OVERRIDE | INIT EST |
| 1 | ☐ | | 1 | YES | SRA - SYSTEM REQUIREMENTS ANALYSIS (M) | | | | | 911.7 |
| 2 | ☐ | | 2 | YES | PPM 1 - START-UP | | | | | 33.8 |
| 3 | ☐ | ○ | 3 | NO | PPM1.1 - ENGAGE STAKEHOLDERS | ESTIMATE AS UNIT (PPM) - 1 TO 2 HR | 1 | [4]1*1.5*.967+0=1.5 | | 1.5 |
| 4 | ☐ | ○ | 3 | NO | PPM1.2 - ESTABLISH OR CONFIRM PROJECT MANAGEMENT PROCESSES | ESTIMATE AS UNIT (PPM) - 6 TO 8 HR | 1 | [4]1*7*.967+0=6.8 | | 6.8 |
| 5 | ☐ | ○ | 3 | NO | PPM1.2A - ESTABLISH OR CONFIRM CONFIGURATION MANAGEMENT PROCESSES | ESTIMATE AS UNIT (PPM) - 2 TO 4 HR | 1 | [4]1*3*.967+0=2.9 | | 2.9 |
| 6 | ☐ | ○ | 3 | NO | PPM1.2B - ESTABLISH OR CONFIRM QUALITY MANAGEMENT PROCESSES | ESTIMATE AS UNIT (PPM) - 2 TO 4 HR | 1 | [4]1*3*.967+0=2.9 | | 2.9 |

*FIG. 5*

PROJECT ESTIMATING SYSTEM AND METHOD

BACKGROUND OF THE INVENTION

1. Technical Field

The present invention relates generally to project estimating processes, and more specifically relates to a system and method for allocating time among tasks in a project estimating program.

2. Related Art

The ability to accurately estimate complex projects at the task level is critical for project scheduling and thus allocating budgets, resources, and time. However, very complex projects often include hundreds of tasks, with each task consuming some unpredictable amount of time. Providing an accurate and efficient mechanism for allocating time for each task therefore represents an important aspect of an estimating process.

One method to address the problem is to simply estimate a time allocation for each task, and then add up all of the time to arrive at a total project time. This methodology, however, is problematic since the calculated elapsed project time might significantly differ from a targeted or expected elapsed project time. The planner in this case must then revise individual task allocations to meet an expected total project time. Unfortunately, given that hundreds of tasks might exist, reallocating time among the tasks becomes a very time consuming process. Moreover, an estimating program might utilize estimating factors (e.g., a range of hours), as opposed to a fixed time, to estimate some tasks. Accordingly, it is not necessarily a simple process to adjust time allocations across a set of tasks.

Furthermore, it may be the case that it becomes necessary to adjust the time allocations for tasks after one or more phases of a project have been completed. For instance, if a first phase took longer than expected to complete, how will that impact the estimated time allocated for each remaining task? Accordingly, a need exists for a system that can allocate time for tasks at a high speed in a project estimating program.

SUMMARY OF THE INVENTION

The present invention addresses the above-mentioned problems, as well as others by providing a system and method for utilizing an iterative top-down process for allocating time among tasks in a project estimating program. In a first aspect, the invention provides a project estimating system for allocating time to a list of tasks, comprising: a system for determining a total project time to complete a project; and a time allocation system that generates a task time for each task based on the total project time and an estimating factor associated with each task, wherein the time allocation system includes an iterative algorithm that iteratively calculates an adjustment factor to be applied to each task.

In a second aspect, the invention provides an estimating method for allocating time to a list of tasks for a project, comprising: calculating a total project time to complete the project based on: (1) a project type that outlines each phase of the project; (2) an estimated relative time required to complete each phase; and (3) an actual amount of time taken to complete at least one phase; and providing an estimating factor for each task in the list of tasks; calculating a task time for each task based on the estimating factor and an adjustment factor; summing each task time to generate a total calculated time to complete the project; and revising the adjustment factor; iteratively repeating the calculating, summing and revising steps until the total calculated time falls within a predetermined proximity to the total project time.

In a third aspect, the invention provides a program product stored on a recordable medium for allocating time to tasks for a project, comprising: means for calculating a total project time; means for calculating a task time for each task in a list of tasks based on an estimating factor providing for each task and an adjustment factor; means for summing each task time to generate a total calculated time to complete the project; and means for iteratively revising the adjustment factor such that the total calculated time falls within a predetermined proximity to the total project time.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a screenshot of a total project time estimation system in accordance with the present invention before operation.

FIG. 3 depicts an updated screenshot of the total project time estimation system shown in FIG. 2 after operation.

FIG. 4 depicts a screenshot of a time allocation system in accordance with the present invention before operation.

FIG. 5 depicts an updated screenshot of the time allocation system shown in FIG. 4 after operation.

DETAILED DESCRIPTION OF THE INVENTION

Figure 1:
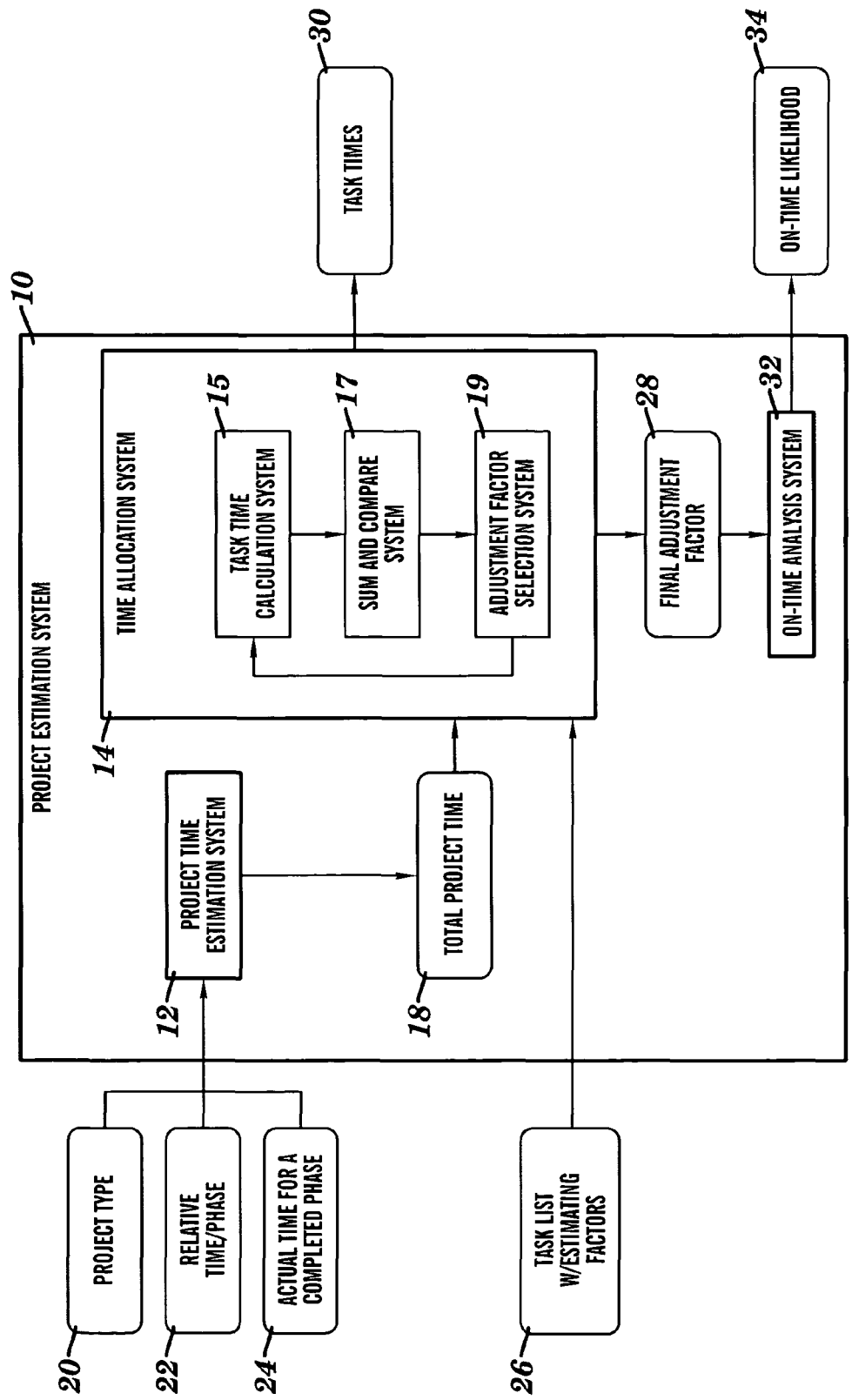
FIG. 1 depicts a project estimating system in accordance with the present invention.

Referring now to the drawings, FIG. 1 depicts a project estimation system 10 for allocating time among a set of tasks. The invention may be implemented as a software program product that includes a project time estimation system 12, a time allocation system 14, and an on-time analysis system 32. Project time estimation system 12 utilizes a top down approach to estimate the total number of hours it will take to complete a project (i.e., total project time 18). Time allocation system 14 calculates task times for each task using a bottom-up approach, and then adjusts task times with an adjustment factor so that the sum of all task times substantially meets the total project time 18. Finally, an on-time analysis system 32 may be implemented to determine an on-time likelihood 34 for completing the project based on the adjustment factor used by the time allocation system 14.

Project time system 12 estimates the total project time 18 to complete the project based upon: (1) the project type 20 (i.e., the number and type of phases); (2) a relative amount of time estimated to complete each phase 22 likely based on histories from prior projects; and (3) an actual number of hours expended to complete at least one phase. Thus, for instance, assume the project type 20 included five phases, and it was known based on prior experiences that the relative amount of time estimated to complete each phase 22 was as follows:

Phase 1: 10%
Phase 2: 20%
Phase 3: 30%
Phase 4: 30%
Phase 5: 10%

Further assume that the phase 1 was complete in 100 hours. The estimated time for each phase could then be projected, resulting in phase 2 taking an estimated 200 hours, phase 3 taking an estimated 300 hours, phase 4 taking an estimated 300 hours and phase 5 taking an estimated 100 hours. The total project time 18, which comprises the sum of all phases (i.e., 1000 hours), is then output and made available to time allocation system 14. It should be noted that other methods for calculating the total project time 18 could be implemented without departing from the scope of the invention. It should also be understood that the term "phase" is not limited and can refer to any portion of a project lifecycle.

Time allocation system 14 calculates task times 30 for each task in the task list 26. Time allocation system 14 uses an iterative algorithm that includes a task time calculation system 15, a sum and compare system 17, and an adjustment factor selection system 19 (initially, the adjustment factor may be set to one). Task time calculation system 15 calculates the task time for each task with a predetermined formula that is a function of an estimating factor for the task and an adjustment factor. Each task includes an estimating factor that provides a basis for calculating task times 30. Estimating factors are generally determined by past project experiences. For instance, it may be known that for a planning task, six planning meetings are typically required, and each meeting takes between one and two hours. Accordingly, the estimating factor in this case includes a range (1-2 hours) and a count (6 events). In other cases, the estimating factor may simply include a single time value, e.g., the estimating factor for performing a code review might be 6 hours.

In one exemplary embodiment where the estimating factor includes a range and count, task time calculation system 15 may determine the task time T utilizing a formula that takes the average of the range A, multiplied by the count C, multiplied by the adjustment factor AF. Thus, $$T = A * C * AF.$$

Sum and compare system 17 sums each of the task times to arrive at "total calculated time." The total calculated time is then compare to the total project time 18. In the event that the total calculated time does not fall within a predetermined proximity (e.g., plus or minus some percentage or amount of time) to the total project time 18, adjustment factor selection system 19 selects a revised adjustment factor. Specifically, adjustment factor selection system 19 raises the adjustment factor if the total calculated time is too low relative to the total project time, and lowers the adjustment factor if the total calculated time is too high relative to the total project time. Any method may be utilized to select the revised adjustment factor.

Once the revised adjustment factor is selected, task time calculation system 15 recalculates each task time, and sum and compare system 17 repeats its process to determine if the revised total calculated time falls within the predetermined proximity to the total project time 18. If the predetermined proximity is not met, then the algorithm 15, 17, 19 iterates until an adjustment factor is selected such that the proximity is met. Once the total calculated time falls within the predetermined proximity to the total project time, the allocation process is complete and task times 30 for each task in the task list 26 can be output.

In addition, the final adjustment factor 28 can be used by on-time analysis system 32 to provide an indication of project risk and determine the likelihood that the project will be completed on time. For instance, if the final adjustment factor is very low (much less than 1.0), then that would indicate a low likelihood of on-time completion. Conversely, a final adjustment factor very close to, or greater than 1.0, would indicate a high likelihood of on-time completion. On-time analysis system 32 could, for instance, utilize a table to determine an on-time likelihood value, e.g., low medium, high, based on ranges of the final adjustment factor.

Referring now to FIG. 2, an exemplary interface 40 is depicted for calculating total projects hours 18 for a project based on an input 42 that comprises an actual number of hours for a completed phase. In this example, a first column 44 lists five phases and their modules. The five phases comprise Requirements Analysis, Solution Definition, Design, Build and Test, and Transition. The relative hours per phase 22 are listed in column 46, i.e., 10%, 20%, 10%, 55% and 5%, respectively. In column 48, a user has entered 994 hours as the actual hours to complete the Requirements Analysis phase (i.e., phase 1).

FIG. 3 depicts the results after the data from FIG. 2 has been submitted to project time estimation system 12, with the total project time 18 having been calculated as 9940 hours. In addition, a breakdown of phase hours for each of the remaining uncompleted phases is provided in column 48, respectively.

Referring now to FIG. 4, a time allocation system interface 50 is shown for the same project that includes a (partial) task list 52, estimating factors for each task including range data 54 and count data 56, applied calculation formulas for the estimating factors, and initial estimated task times 60 for each task. Note that while this project may include hundreds of tasks, only five tasks are listed for simplicity purposes. In addition, the total estimated hours, which is carried over from FIG. 3 (i.e., 9940 hours) is entered in box 64. Furthermore, an initial total calculated time 62 (which sums each of the initial estimates for each task) is shown. In this case, the initial total calculated time 62 is 10328.3 hours, which is significantly higher than the estimated total hours 9940. Accordingly, an adjustment factor must be calculated and applied to each task time.

As noted, estimating factors appear in columns 54 and 56 for each task. A calculation formula selected in drop down box 66 is applied to the range and count data. As can be seen, some tasks (e.g., tasks 3-5) have estimating factors that include range and count data, while others (e.g., tasks 1-2) simply provide an initial estimate. Thus, for instance, the third task "Engage Stakeholders" has a range of 1-2 hours and a count of 1, which results in an initial estimate of 6.0 hours.

FIG. 5 depicts an updated interface of FIG. 4, after the iterative algorithm has been executed. As can be seen, an adjustment factor 68 has been iteratively calculated as 0.967, and has been incorporated with each estimating factor to calculate a task time 70 for each task. In the cases where the tasks did not include range and count data, the initial time is simply multiplied by the adjustment factor. In the cases where the tasks include range and count data, the adjustment factor is factored into the calculation.

As can be seen, the total calculated time after running the algorithm is now 9936.3 hours, which is "close enough" to the total project time of 9940, i.e., the predetermined proximity has been met. It should be understood that any predetermined proximity may be utilized, e.g., ±2%, within 1 hour, etc.

It is also understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A project time estimating system, including a computer hardware processing device comprising:
   a system for determining with the computer hardware processing device a total project time to complete a project, wherein a plurality of tasks are required to complete the project, and wherein each task time is based upon an estimating factor;
   a time allocation system that generates with the computer hardware processing device at least one updated task time for each task based on the task time and an adjustment factor, wherein the adjustment factor is initially set to one, wherein the time allocation system includes an iterative algorithm that iteratively recalculates the adjustment factor to be applied to each task, and wherein the iterative recalculation generates a final adjustment factor;
   a system for summing with the computer hardware processing device an actual time required to complete a project phase and at least one of the task times or the updated task times for each uncompleted task, and comparing the sum to the total project time; and
   an on-time analysis system for determining with the computer hardware processing device an on-time likelihood for completing the project based on the final adjustment factor.

2. The project estimating system of claim 1, wherein the total project time to complete the project is determined based on:
   an inputted project type that outlines each phase of the project;
   an estimated relative amount of time required to complete each phase; and
   an actual amount of time taken to complete at least one phase.

3. The project estimating system of claim 1, wherein the estimating factor for each task comprises a time range and a count.

4. The project estimating system of claim 1, wherein the iterative algorithm raises the adjustment factor if the total calculated time is too low relative to the estimated total time, and lowers the adjustment factor if the total calculated time is too high relative to the estimated total time.

5. A project time estimating method, comprising at least one computing device for processing the steps of:
   calculating with a computer hardware processing device a total project time to complete a project, wherein a plurality of tasks are required to complete the project, wherein each task time is based upon an estimating factor, and wherein the total project time is based on:
      a project type that outlines each phase of the project;
      an estimated relative time required to complete each phase; and
      an actual amount of time taken to complete at least one phase; and
   providing an estimating factor for each task;
   calculating at least one updated task time for each task based on the task time and an adjustment factor, wherein the adjustment factor is initially set to one, wherein the calculating updated task time includes an iterative algorithm that iteratively recalculates the adjustment factor to be applied to each task, and wherein the iterative recalculation generates a final adjustment factor;
   summing an actual time required to complete a project phase and at least one of the task times or the updated task times for each uncompleted task, and comparing the sum to the total project time;
   iteratively repeating the calculating updated task time and summing steps until the adjustment factor falls within a proximity to a predetermined value;
   determining a likelihood that the project will be completed on time based on the final adjustment factor; and
   generating at least one of a total project time report and a time allocation report.

6. The method of claim 5, wherein the step of calculating a task time for each task based on the estimating factor includes the steps of:
   taking an average of a range provided by the estimating factor; and
   multiplying the average by a count and by the adjustment factor.

7. The method of claim 5, wherein the step of revising the adjustment factor raises the adjustment factor if the total calculated time is too low relative to the total project time, and lowers the adjustment factor if the total calculated time is too high relative to the total project time.

8. A computer readable medium storing a program product for estimating project time, comprising:
   program code for calculating a total project time, wherein a plurality of tasks are required to complete the project, and wherein each task time is based upon an estimating factor;
   program code for calculating at least one updated task time for each task based on the task time and an adjustment factor, wherein the adjustment factor is initially set to one, wherein the program code for calculating at least one updated task time includes an iterative algorithm that iteratively recalculates the adjustment factor to be applied to each task, and wherein the iterative recalculation generates a final adjustment factor;
   program code for summing an actual time required to complete a project phase and at least one of the task times or the updated task times for each uncompleted task, and comparing the sum to the total project time;
   program code for iteratively revising the adjustment factor until the adjustment factor falls within a proximity to a predetermined value
   program code for determining a likelihood of on-time completion based on the final adjustment factor; and
   program code for generating at least one of a total project time report and a time allocation report.

9. The program product of claim 8, wherein the program code for iteratively revising the adjustment factor raises the adjustment factor if the total calculated time is too low relative to the total project time, and lowers the adjustment factor if the total calculated time is too high relative to the total project time.

10. The program product of claim 8, wherein each estimating factor includes a range of times and a count.

11. The program product of claim 8, wherein the estimating factor includes a fixed time amount.

12. The program product of claim 8, wherein the program code for calculating a total project time is based on:
- a project type that outlines each phase of the project;
- an estimated relative time required to complete each phase; and
- an actual amount of time taken to complete at least one phase.

* * * * *